United States Patent [19]

Wienert

[11] 4,419,186
[45] Dec. 6, 1983

[54] PROCESS FOR MAKING STRONG METALLURGICAL COKE

[76] Inventor: Fritz O. Wienert, 394 Roosevelt Ave., Niagara Falls, N.Y. 14305

[21] Appl. No.: 329,717

[22] Filed: Dec. 11, 1981

[51] Int. Cl.³ .................... C10B 47/10; C10B 53/08
[52] U.S. Cl. ........................... 201/6; 201/20; 201/22; 201/24; 201/42
[58] Field of Search ............ 201/5, 6, 8, 20, 22, 201/24, 42; 44/10 C, 10 D, 10 E, 10 L, 10 K, 26

[56] References Cited

U.S. PATENT DOCUMENTS

| | | | |
|---|---|---|---|
| 1,471,647 | 10/1923 | Chance | 201/6 |
| 1,903,237 | 3/1933 | Johnston | 201/6 |
| 2,556,154 | 6/1951 | Kern | 201/24 |
| 3,185,635 | 5/1965 | Greglow | 201/6 |
| 3,475,278 | 10/1969 | Peters et al. | 201/6 |
| 3,560,346 | 2/1971 | Gunter | 201/20 |
| 3,996,108 | 12/1976 | Joseph | 201/22 |
| 4,178,215 | 12/1979 | Kiritani et al. | 201/23 |
| 4,186,054 | 1/1980 | Brayton et al. | 201/24 |
| 4,197,160 | 4/1980 | Degrave et al. | 201/6 |
| 4,248,669 | 2/1981 | Theodore et al. | 201/23 |

FOREIGN PATENT DOCUMENTS 248628  8/1978  U.S.S.R. .................. 201/6

OTHER PUBLICATIONS

"Agglomeration"; Chem. Engineering; Oct. 1951; pp. 161–174.

Primary Examiner—Bradley Garris
Attorney, Agent, or Firm—Raymond F. Kramer

[57] ABSTRACT

The strength and density of a metallurgical coke produced in a slot coke oven are both increased by replacing at least a part of the normal loose charge in the oven with compacted materials and fragments thereof made from a mixture of particularly sized particulate fusible bituminous coal particles, non-fusible particles of a material compatible with the burden of a blast furnace, and water. During compacting the pressure and the moisture content of the mix are such that at least some water is squeezed out of the mix. The non-fusible materials that are useful include non-coking coals, poorly coking coals, other carbonaceous materials, such as coke breeze, char, anthracite, lignite, and iron oxide-bearing materials, such as iron ores and waste materials from steel plants. At least a major proportion of the fusible particles and at least a substantial proportion of the non-fusible particles are smaller than about 0.15 mm. The proportion of fusible to non-fusible particles used is such that such mixture of compacted materials and fragments made from such compacted materials that is charged to the slot coke oven becomes transiently plastic, shrinks and forms a single mass of coke when heated to a coking temperature in the oven, which coke mass is readily dischargeable from such oven.

14 Claims, No Drawings

PROCESS FOR MAKING STRONG METALLURGICAL COKE

This invention relates to a process for the manufacture of metallurgical coke. More particularly, it relates to the manufacture fo briquettes or other compacted products from fusible bituminous coal particles, particles of a non-fusible material which is compatible with a blast furnace burden, and water, and to the employment of such compacted forms and any fragments thereof as at least part of a charge to a coke oven to make a coke of increased strength and density.

It is known to make metallurgical cokes from low-volatile bituminous coals and high-volatile bituminous coals. The latter coals are generally preferred for this purpose because they are available in good supply and are less expensive than low-volatile bituminous coals. However, such high-volatile coals swell so much during processing in a coke oven that low-volatile type bituminous coals are admixed with them to prevent damage to the oven walls due to excessive expansion during coking, and also, to decrease resistance to the pusher when the coke is to be discharged from the oven. Conventionally, the coal blend for the oven feed includes about 70 parts of high-volatile bituminous coal or coals and about 30 parts of low-volatile bituminous coal or coals.

It is known that stronger cokes improve the performance of blast furnaces and cupolas, and it is also known that a higher bulk weight of the charge (corresponding to a higher bulk density) in the chambers of a slot coke oven results in the production of a stronger coke. To increase the bulk weight or bulk density of the charge it is a common practice to crush the coals to be charged so that about 80% of the particles are smaller than about 3 millimeters in diameter. To obtain such particle sizes it is common practice to crush or grind moist coals in such a way that particles smaller than about 0.15 mm. are avoided as much as possible. This is so because such finer particles, in combination with the moisture content in the coals, which is usually about 6%, can clog the grinding equipment and impede the flow of the feed into the chambers and within the chambers of the coke oven, so that the bulk weight of the charge would be decreased and the strength of the resulting coke would be lowered. It is also known that the bulk weight in the oven chambers may be increased by briquetting some of the coals of the feed and usually about 30% thereof is briquetted. Briquetting of a greater proportion of the feed than about 30% is avoided because it would cause an increase in wall pressure and resistance to the pusher to an extent that is dangerous. In the practiced briquetting procedure the coal particles of the conventional blend, of which about 80% are smaller in diameter than 3 mm., are mixed with about 8% (on a total weight basis) of asphalt, tar or pitch, or any mixture thereof. It is also known in the art to compact moist coal particles, which may be smaller than 2 mm. in diameter, without the use of a binder by means of pocketed double rolls to form briquettes or to compact such particles by means of smooth double rolls to a continuous strip, which is then fragmented. Both types of such compacted materials are relatively weak and are broken up easily in handling. In one process such compacted products are intentionally fragmented before being fed to a coke oven. It should be noted that all the charges of the present or prior art practice expand more or less in the chambers of the coke oven.

It is known that minor portions of non-coking coals, poorly coking coals and coke breeze may be admixed with other parts of the feed of a coke oven, although their presence lowers the strength of the resulting coke. Nevertheless, additions of such materials have been made for economic reasons in processes wherein about 30% of the loose feed containing some coke breeze is briquetted, while employing a hydrocarbon binder. The mentioned briquetting helps to produce stronger coke and thus, compensates at least in part for the weakening effect of the accompanying 70% of loose blend.

A primary object of the present invention is to increase the strength (commonly referred to as stability) of metallurgical coke, and to do this while at the same time increasing the use of non-coking coals, poorly coking coals and other non-fusible materials which are compatible with the burden of the blast furnace, cupola or other equipment in which the coke is to be employed, such as coke breeze, char, anthracite, lignite, and iron oxide-bearing materials, while at the same time eliminating the use of a hydrocarbon binder for briquetting and eliminating or very substantially diminishing the use of any low-volatile bituminous coals. It has been found that such objectives can be accomplished by mixing together dry particulate fusible bituminous coals and dry particulate non-fusible materials of certain types, with the particles being such that significant proportions thereof are smaller than 100 mesh, Tyler screen scale (about 0.15 mm in diameter), and a certain proportion of water to moisten the particles, and compressing the mixture of such materials at a relatively high pressure to compacted form, such as a briquette, which compacted product and any fragments thereof are subsequently carbonized, by heating in a slot coke oven. During the coking operation the charge in the oven becomes transiently plastic, shrinks and forms a body of strong metallurgical coke, which is easily dischargeable from the oven by the pusher.

In accordance with the present invention a process for making strong metallurgical coke in a slot coke oven comprises mixing together, in a proportion which will result in the mix becoming transiently plastic during subsequent heating in said coke oven, particles of a fusible bituminous coal or a mixture of such coals of which about a major proportion by weight is of a size or sizes smaller than about 0.15 millimeter, and particles of a non-fusible material or mixture of such materials compatible with a blast furnace burden, of which at least a substantial proportion by weight is of a size or sizes smaller than about 0.15 mm., adding water to said mixture in such a proportion that subsequent compacting of such a mixture mixed with the water, at a pressure higher than about 500 kilograms per square centimeter, squeezes out at least 0.1% of water, by weight, based on the weight of the added water, mixing together the mixture of fusible bituminous coal particles and non-fusible material particles and the water, compressing such resulting mixture into a compacted product at a pressure higher than 500 kg./sq. cm. and heating said compacted intermediate product and any fragments thereof which may be present, in a slot coke oven as at least a part of a charge thereto, so that the charge in such oven becomes transiently plastic and shrinks during such heating, and a strong metallurgical coke results. Also within the invention are a process for the manufacture of such compacted products, and the resulting products.

Various significant advantages have been found to result from the practice of methods of this invention. It has been found that briquettes or other compacted products made from a mixture of particles of fusible bituminous coals, particles of non-fusible materials, and water, in certain ranges of weight ratios (and fragments of said compacted products which may be present), do not expand when heated for carbonization in a slot coke oven. Instead, they shrink provided that at least a major proportion by weight, as described, of the fusible particles present can pass through a 100 mesh Tyler sieve, and provided that at least a substantial proportion of the non-fusible particles present is such that they pass through a 100 mesh Tyler sieve. By "major" is meant 50% or more and by "substantial" is meant at least 25% and preferably 35% or more. It was found that increasing the percentage of the fusible particles passing a 100 mesh Tyler sieve from 52.4% progressively to 100% and increasing the percentage of the non-fusible particles passing a 100 mesh Tyler sieve progressively from 43.5% to 100% increased the degree of shrinkage and the apparent density of the resulting coke without any significant effect on the stability of the coke. It was also noted that briquettes compressed with an excess of water present with the particular materials are stronger than those "short" in water content. Additionally, it was observed that the squeezing out of water from the particulate mass during compacting helps to liberate the compacted materials from the molds or pockets, helps keep the pressing surfaces clean, and decreases wear thereof. The following observations were also made with respect to this invention. A higher degree of shrinkage is associated with a higher apparent density of the final coke briquettes but not with their drop stability or strength. The strength of the coke depends mainly on the characteristics of the transient fusion which occurs when the temperature in the charge of the coke oven rises from about 350° C. to about 475° C. Increasing the ratio by weight of fusible particles to non-fusible particles, up to a certain limit, improves the stability of the coke. Prolonging the time the charge is in the transient fusion temperature range also favors a high coke stability despite decreased shrinkage and decreased density of the coke, and such longer fusion period allows reducing the ratio of fusible to non-fusible particles. The present coke, of high stability and a relatively low density, is characterized by having a limited number of cavities which are larger than the numerous pores in conventional coke. Increasing the compaction pressure diminishes the degradation of the green compacted forms on handling and increases their green density but decreases their shrinkage so that the high stability of the resulting coke is about the same as that of coke deriving from materials compacted by a lower pressure and having shrunk to a greater degree. Good coke stability was reached when the carbonization had been terminated with an end temperature of about 600° C. The resulting coke was rich in hydrogen. Its production on a commercial scale will save a considerable amount of energy and will increase the production capacity of the slot coke oven. Also, the same compacted forms or briquettes fragmented to pieces and crumbs to different extents, so that different bulk weights were obtained when the mixtures of pieces and crumbs were charged into the apparatus for carbonization, resulted in cokes of similar density and stability because the charge having the lower bulk weight had shrunk to a greater extent. In other words the shrinkage had the same type of effect as a higher bulk weight. Furthermore, it was found that the mixture of compacted forms or briquettes with fragments and crumbs can be employed alone or can be mixed with a conventional loose coal blend to constitute the charge of the slot coke oven. Another advantage of the invention is in the increasing of the production capacity of the slot coke oven employed by drying the green compacted forms and any fragments thereof before they are charged to said oven.

The following examples illustrate the invention. In the examples and in the specification all parts are by weight, and all temperatures are in °C., unless otherwise indicated. In the examples and throughout the specification the sizes of the particles are defined by the Tyler Screen Scale. The determination that the proportions of particulate materials capable of passing through a 100 mesh Tyler sieve, having openings of 0.144 mm. (about 0.15 mm.) are important in selecting materials to be compacted and coked according to the invention is based on experimental results. The ranges of the size distribution of the particles that are larger and smaller respectively than 0.15 mm. depend on the characteristics of the grinding equipment and its mode of operation, and on the grindability of the various materials. Such factors may vary widely. Therefore such specific weight percentages of the respective size ranges reported in the Examples of the specification are not required and, in fact, variations of the percentages, within the scope of this invention, were found to have little effect. The particles smaller than about 0.15 mm. in diameter were not classified in regard to their size because variations in the percentages of superfines were not found to have any significant adverse effects so long as the processes were within the invention. All of the Examples are working examples and were actually run by the inventor in his laboratory.

EXAMPLE 1

0.8 Part by weight of fusible particles of dry high-volatile bituminous coal and one part by weight of dry particles of non-fusible sub-bituminous coal were mixed well together and then 0.22 part of water was incorporated into the mixture in a muller, so that the agitator exerted pressure on the particles as they were mixed together and the water was distributed evenly throughout the mix. The fusible particles employed analyzed 39.2% of volatile matter, 51.2% of fixed carbon, 6.1% of ash and 0.9% of sulfur, and the non-fusible particles analyzed 35% of volatile matter, 55% of fixed carbon, 5% of ash and 1.3% of sulfur. Such fusible particles were of such sizes that 13.0% by weight passed through a screen having openings of 1 sq. mm. but did not pass through a 35 mesh screen, 27.1% passed through a 35 mesh screen but did not pass through a 65 mesh screen, 7.5% passed through a 65 mesh screen but did not pass through a 100 mesh screen, and 52.4% passed through a 100 mesh screen. Such non-fusible particles were of such sizes that 42.4% by weight passed through a 35 mesh screen but did not pass through a 65 mesh screen, 14.1% passed through the 65 mesh screen and did not pass through a 100 mesh screen and 43.5% passed through a 100 mesh screen. It was found that the pressure agitation in the mulling operation resulted in a rapid and uniform moistening of the described particles and in their cohesion to dense crumbs, which densification facilitates subsequent compacting.

The moist mixture was compacted in a press to cylindrical briquettes by a pressure of 1,100 kg./sq. cm. and at the end of such briquetting 0.01 part of water was squeezed out from the briquettes and wetted the mold walls, as a result of which the cylindrical briquettes were easily removed therefrom. Also, wear on the molds was diminished.

The green cylindrical briquettes simulating a coke oven charge, were then laid on a horizontal surface, spaced apart, and heated in a reducing atmosphere to a temperature of about 950° C., taking 53 minutes to pass through the fusion or plastic range of 350° C. to 475° C. The carbonized cylinders were cooled in a protective atmosphere and were then examined. The shrinkage, which is the difference in volume between the volume of the green cylinders and the cylinders after coking, expressed as a percentage of green cylinder volume, was measured and calculated. The apparent density (da) of the coked cylinders was measured and the so-called drop stability of the cylinders was determined by a laboratory method which is suitable for use with small amounts of materials and which includes dropping the cylinders 40 times per minute for 30 minutes within a steel pipe, from a height of 80 centimeters. In such test the cylinders retained their original shape, with only the edges being abraded. The weight of the cylinders after the test as a percentage of the original weight is called the drop stability. In practice, the stability of conventional coke is determined by the drum test of the American Society for Testing Materials (ASTM), for which test a large amount of coke is required. The test result is expressed as the percentage by weight of surviving coke pieces. A typical sample of a conventional coke with an ASTM value of 58 was tested for its drop stability in the laboratory and the obtained value was 64. That means that the values of drop stability reported herein are about 6 points higher than the corresponding ASTM stabilities. In Example 1 the determined data were as follows: 5% shrinkage; da of coke=0.827; and drop stability of coke=93.3. These data are entered in Table 1.

EXAMPLE 2

In this example the same procedure as in Example 1 was followed and the variables were kept constant with the exception of the sizes of the fusible particles, which were: 31.1% by weight passing a 35 mesh screen but not passing a 65 mesh screen; 8.6% passing a 65 mesh screen but not passing a 100 mesh screen; and 60.3% passing a 100 mesh screen. The obtained data are entered in Table 1.

EXAMPLE 3

In this example the procedure and the variables were the same as in Examples 1 and 2 with the exception of the sizes of the fusible particles which were: 12.5% by weight passing a 65 mesh screen but not passing a 100 mesh screen; and 87.5% passing a 100 mesh screen. The obtained data are entered in Table 1.

EXAMPLE 4

In this example the procedure and the variables were the same as in the Examples 1-3 with the exception that all fusible particles passed a 100 mesh screen. The obtained data are entered in Table 1.

TABLE 1

| Example No. | Fusible Particles Through 100 mesh Screen (%) | Shrinkage (%) | Coke da (g./cc.) | Coke Drop Stability |
|---|---|---|---|---|
| 1 | 52.4 | 5 | 0.827 | 93.3 |
| 2 | 60.3 | 12.5 | 0.883 | 92.7 |
| 3 | 87.5 | 20.7 | 0.924 | 91.3 |
| 4 | 100 | 26.0 | 1.09 | 88.5 |

From the above table it is apparent that increasing the percentage of fusible particles passing a 100 mesh screen increases the shrinkage during carbonization and increases the apparent density of the coke that is produced. The drop stability of the briquettes is high although somewhat diminished in Example 4 for reasons which will be apparent.

EXAMPLES 5-7

In these examples essentially the same experiments as those described in Examples 1-4 above were run with the exception that the same size distribution of the fusible bituminous coal particles was used in all three examples. It was 4% through a 35 mesh screen and on a 65 mesh screen, 13.6% through a 65 mesh screen and on a 100 mesh screen and 82.4% through a 100 mesh screen, whereas the percentage of non-fusible particles was varied from 43.5% through a 100 mesh screen to 75.5% through such a screen, and to 100% through such screen, respectively. The heating time during which the temperature rose from 350° C. to 475° C. was 74 minutes. For Example 5, 42.4% of the non-fusible particles passed a 35 mesh screen and remained on a 65 mesh screen and 14.1% passed a 65 mesh screen and remained on a 100 mesh screen. For Example 6, 24.5% passed a 65 mesh screen and remained on a 100 mesh screen. The following table shows the changes in shrinkage, apparent density and drop stability as the fineness of the non-fusible particles is varied.

TABLE 2

| Example No. | Non-Fusible Particles Through 100 Mesh Screen (%) | Shrinkage (%) | Coke da (g./cc.) | Coke Drop Stability |
|---|---|---|---|---|
| 5 | 43.5 | 12.7 | 0.907 | 94.6 |
| 6 | 75.5 | 21.4 | 1.03 | 95.2 |
| 7 | 100.0 | 22.0 | 1.04 | 94.7 |

This table shows that when the proportion of non-fusible particles passing a No. 100 sieve increases from about 40% to about 75% shrinkage and density are significantly affected but upon further increase to 100% there is little change. Although the shrinkage of the briquette of Example 5 is much less than the shrinkage of the briquettes of Examples 6 and 7, and the apparent density is correspondingly lower, the drop stability is not much less than for the briquettes of Examples 6 and 7. This is attributable to the fact that with the coarser particles of Example 5 interstitial cavities were larger, causing a lowering of the density, but such cavities were found to be enclosed by relatively thick walls which strengthen the briquette and result in the improved drop stability. In conventional coke, on the other hand, there are numerous pores which are separated by thin walls, most of which are open. Accordingly, the stability is lower and carbon dioxide can easily diffuse into the conventional coke when it is in the blast furnace and can dissolve the carbon. In other words conventional coke has a relatively high reactivity, whereas the above mentioned structure of the coke made according to the present invention hinders the diffusion of carbon dioxide into the coke, causing the coke to be of a lower reactivity.

EXAMPLES 8-11

The experiments of Examples 1-4 were repeated with certain changes. While the fusible and infusible particle materials employed were of the same compositions, their particle size distributions were different. The fusible particles were of the following sizes: 2.2% through a 35 mesh screen and on a 65 mesh screen, 7.1% through a 65 mesh screen and on a 100 mesh screen and 90.7% through a 100 mesh screen. The particle size distribution of the non-fusible particles was: 1.9% through a 35 mesh screen and on a 65 mesh screen; 4.6% through a 65 mesh screen and on a 100 mesh screen; and 93.5% through a 100 mesh screen. The fusion period in the carbonizing step was 45 minutes. The variable in Examples 8-11 was the ratio of fusibles to non-fusibles and such ratio was 0.5, 0.6, 0.7 and 0.8, respectively, in Examples 8-11.

The following table gives the shrinkage, apparent density and drop stability of the coke, and a plasticity factor. It has been found that shrinkage alone does not result in very high drop stabilities but to obtain such stabilities shrinkage should be accompanied by a transient plasticity, which occurs when the temperature rises as the charge passes through the fusion range of about 350° to 475° C. Such plasticity is evidenced by the sagging of originally circular cross-sections of the green cylinders to oval cross-sections after carbonization in a horizontal position. The difference between the longer horizontal diameter and the shorter vertical diameter is considered to indicate the degree of plasticity. This difference, expressed as a percentage of the horizontal diameter, will be referred to as the plasticity factor.

TABLE 3

| Example No. | Fusible: Non-Fusible Particles Ratio | Shrinkage (%) | Coke da (g./cc.) | Coke Stability | Plasticity Factor |
|---|---|---|---|---|---|
| 8 | 0.5 | 33 | 1.18 | 88 | 0.9 |
| 9 | 0.6 | 35 | 1.24 | 93 | 0.5 |
| 10 | 0.7 | 34 | 1.20 | 92 | 6.8 |
| 11 | 0.8 | 30 | 1.1 | 96 | 10.2 |

The above table shows that when the weight ratio of fusible:non-fusible particles is about 0.6 the highest coke density and the greatest shrinkage are obtained. When the ratio is 0.8 there is less shrinkage and a lower density results but stability and plasticity are high. As was previously mentioned with respect to the discussion of the results shown in Table 2, this apparent discrepancy is explained by the structure of the briquettes, which in such case includes a lesser number of larger cavities with relatively thick walls surrounding them, the cavities lowering the density and the thick walls being responsible for the high stability.

EXAMPLES 12-14

This series of examples was run in the same manner as Examples 8-11 with the exceptions that the fusion period was 94 minutes and ratios of fusible to non-fusible particles in the range of 0.4 to 0.6 were employed. Results of these experiments are shown in the following table.

TABLE 4

| Example No. | Fusible: Non-Fusible Particles Ratio | Shrinkage (%) | Coke da (g./cc.) | Coke Stability | Plasticity Factor |
|---|---|---|---|---|---|
| 12 | 0.4 | 13 | 0.86 | 95 | 4.4 |
| 13 | 0.5 | 13 | 0.85 | 96 | 4.4 |
| 14 | 0.6 | 3 | 0.74 | 95 | 4.6 |

This table indicates that the longer fusion period results in less shrinkage and a lower apparent density of the coke but does not adversely affect drop stability and the plasticity factor. Also, as the ratio of fusible:non-fusible particles is increased, the shrinkage and apparent density diminish.

EXAMPLES 15-20

The experiments of these examples were run using, as the fusible bituminous coal particles, a mixture of two high-volatile bituminous coals of about the same composition as the high-volatile bituminous coal used in Examples 1-4, with all the particles of such coal passing a 100 mesh screen. The non-fusible particles were also of the same composition as those of Examples 1-4, with all the particles thereof passing through a 100 mesh screen. The two types of particles were mixed in weight ratios of fusible particles:non-fusible particles equal to 0.3, 0.45 and 0.6, respectively. The mixtures were moistened with an excess of water, as described in Examples 1-4, and each moist mixture was compacted to briquette form, as in those examples, but with the pressures being 1,100 and 1,850 kg./sq. cm., respectively. Use of the higher compacting pressure caused the squeezing out of more water from the green cylinders so that they were of a greater density than when the lesser pressure was employed. The green cylinders made were also stronger, surviving undamaged five drops from a height of 30 cm., whereas cylinders compacted at the lower pressure survived only three such drops. Because green strength influences the extent of degradation of the briquettes when they are handled it is an advantage of the present process that the extent of such degradation can be controlled by controlling the compacting pressure. However, although the employment of higher pressures, e.g., 2,000-5,000 kg./sq. cm., will improve the strength of the green compacted forms further, apparently only minor changes in the stabilities of the resulting coke were found when changes in compacting pressure were made in the range of these examples. In addition to variations in proportions of fusible:non-fusible particles, and compacting pressures, another change made in Examples 15-20 was in the time of heating through the fusion range, such time being 130 minutes. Longer times may be employed too but it appears that a practical limit is about five hours. During such heating a slight axial pressure was maintained on the green cylinders, causing deformation thereof, indicating plasticity. The following table gives the results of these experiments.

TABLE 5

| Example No. | Fusible:Non-Fusible Particles Ratio | Compacting Pressure (kg./sq. cm.) | Green Briquettes Density (g./cc.) | Shrinkage (%) | Coke da (g./cc.) | Coke Stability |
|---|---|---|---|---|---|---|
| 15 | 0.3 | 1100 | 1.237 | 22.7 | 1.0 | 96.5 |
| 16 | 0.3 | 1850 | 1.289 | 20.7 | 1.3 | 96.8 |

TABLE 5-continued

| Example No. | Fusible:Non-Fusible Particles Ratio | Compacting Pressure (kg./sq. cm.) | Green Briquettes Density (g./cc.) | Shrinkage (%) | Coke da (g./cc.) | Coke Stability |
|---|---|---|---|---|---|---|
| 17 | 0.45 | 1100 | 1.221 | 22.4 | 0.98 | 97.1 |
| 18 | 0.45 | 1850 | 1.282 | 21.0 | 1.0 | 97.1 |
| 19 | 0.6 | 1100 | 1.215 | 18.0 | 0.92 | 96.1 |
| 20 | 0.6 | 1850 | 1.274 | 17.0 | 0.97 | 95.2 |

The above table shows that the denser green cylinders which resulted from compacting at a higher pressure shrank less during carbonization but the apparent density and stability of the coke resulting were about the same as for the cylindrical briquettes compacted at the lower pressure. Table 5 also illustrates very important features of the present process, that high coke stability and a dense coke are obtainable with a smaller proportion of fusible particles in the mixture to be compacted provided that the fusion period is longer due to a slower heating rate in this period. On the other hand, if it is desired to produce a coke of a lower density and high stability a higher proportion of fusible particles may be employed, as was indicated by Table 5 and Tables 3 and 4.

Cokes may be made from a mixture of compacted forms and fragments and crumbs thereof and also from mixtures of such with conventional loose charge to a coke oven. A feature of the present invention is the discovery that the mixture of green compacted products or briquettes made according to this invention, with fragments and crumbs of such also being present, which mixture has a relatively low bulk weight when charged into the slots of a coke oven, will result in a coke of high stability because of shrinkage during the carbonization process and because of the structure of the coke resulting. The following experiments illustrate such processes and results.

EXAMPLES 21-22

In these examples 34 parts of particles of the high-volatile bituminous coal of the type employed in Example 1, passing through a 100 mesh screen, were mixed with 66 parts of particles of the sub-bituminous non-fusible coal of Example 1, also passing through a 100 mesh screen, and 12.5 parts of water were incorporated into the mixture by means of a muller-like mixing device, after which the moist mixture was compressed to a layer about 6 mm. thick by a pressure of about 1,100 kg./sq. cm., with a small proportion of water, over 0.1% being squeezed out. This layer simulated a continuous strip such as that which is formed by compacting between smooth double rolls. In Example 21 a part of such layer was divided into fragments and crumbs smaller than about 3 mm. in one direction. The resulting material was charged into a crucible. The surface of the charge was tapped slightly to simulate the weight of overlying material and then a moist ash-free filter paper was pressed onto the surface of the charge and a layer of particles of non-fusible coal (coke breeze may be substituted) passing through a 35 mesh screen was spread over the paper. Finally, the crucible was covered with a loosely fitting steel lid and was heated in a gas-fired furnace to a temperature of about 900° C., after which it was cooled in the open air. The residual fine coke breeze was removed and it was noted that the original charge had shrunk to a cake of coke which, on handling, cracked into pieces, each weighing about 2.5 grams.

In Example 22 another part of the layer made was divided into pieces smaller than about 6 mm. (but larger than 3 mm.), which, together with some smaller crumbs formed during the breaking, were charged into a crucible and were processed in the same way as for Example 21. The obtained cake of coke also cracked into large pieces on handling. The following table illustrates the results of these experiments.

TABLE 6

| Example No. | Feed Size (mm.) | Bulk Density (g./cc.) | Shrinkage (%) | Coke da (g./cc.) | Drop Stability | ASTM Stability (estimated) |
|---|---|---|---|---|---|---|
| 21 | −3 | 0.56 | 39.6 | 0.649 | 91.7 | 85 |
| 22 | −6 | 0.74 | 30.9 | 0.696 | 87.8 | 82 |

The above table shows that the charge of Example 21, having a bulk weight of 0.56 g./cc., shrank more than the charge of Example 22, having a higher bulk weight of 0.74 g./cc., so that both examples resulted in productions of cokes of similar stabilities. To obtain a high production capacity of a slot coke oven it is advantageous to have a high bulk weight of the charge in the chambers and it is seen from these experiments that a satisfactory high drop stability can also be obtained at such high bulk weights by employing preferred sizes of the oven feed.

The above examples also illustrate that a maximum temperature of about 900° C. is sufficient to produce extraordinarily strong coke. In other experiments still lower end temperatures, down to about 600° C., also resulted in a strong coke rich in hydrogen, which is liberated when the coke descends in the blast furnace. It should be noted that application of lower end-temperatures of carbonization increases production capacity of the slot coke oven and decreases energy requirements for coking.

Another way to increase production capacity of a slot coke oven includes drying the green briquettes or compacted forms and fragments thereof before such are charged to the coke oven. It has also been found that such pre-drying of the oven feed will not form dust when it is carried out while the feed lies at rest, as in the foregoing examples.

In the above experiments it should be understood that other fusible bituminous coals than those recited above may be employed, such as those of the medium- and low-volatile types. Similarly, other non-fusible materials compatible with the blast furnace and cupola, such as coke breeze, anthracite, char, lignite, limestone and iron oxide-containing materials, such as iron ores and waste materials from integrated iron and steel plants, have also been used to make green compacts according to the present process, which were carbonized to cokes of high stabilities. Of course, it is to be understood that in the selection of carbonaceous materials, the ash and sulfur contents thereof will be such as to be suitable for blast furnace use.

On an industrial scale the compression of the moist mixture of fusible and non-fusible particles according to the present process can be carried out by means of pocketed double rolls forming pillow-shaped briquettes or by smooth double rolls forming a continuous strip, which is subsequently divided into fragments. When such briquettes or fragments are fed into a slot coke oven it is desirable to mix fragments and crumbs with the larger bodies to achieve a high bulk density. Handling of the briquettes and dividing the compacted strip inherently generate fragments and crumbs. It is understood that rough handling and extensive dividing can increase the proportion of small fragments and crumbs and if such is desired that type of handling and dividing may intentionally be employed. Alternatively, some of the conventional loose feed of coal blends can be admixed with the feed of the slot coke oven produced according to the present invention.

Various advantages of the present invention have been mentioned but the most significant of these is that there is produced a new metallurgical coke especially useful in the blast furnace because of its extraordinarily high stability, which is greater than 80 (ASTM Scale), whereas conventional coke of good quality has a stability of about 58, on the same scale. It is considered that this extraordinary stability of the new coke results from shrinkage of the coke oven charge during carbonization to a cake of coke which is dense and has relatively few cavities, which are completely enclosed by relatively thick walls. This structure also results in the coke being of desirable low reactivity. In contrast, conventional coal blends normally employed for making metallurgical coke expand during carbonization, producing a coke with numerous pores which are mostly open and are separated by comparatively thin walls. Of course, in normal coke production the charge expands, which results in increasing the pressure needed to discharge the coke from the slot coke oven and helps to shorten the useful lives of the coke oven walls, whereas because of the shrinkage of the charge during carbonization in accordance with the present invention, pusher pressures are decreased and oven wall lives are increased.

The present process allows the use of high volatile bituminous coals, which are less expensive than low volatile bituminous coals, which are otherwise often required for coking operations to avoid excessive expansion during the coking process. Furthermore, the high volatile coals are more readily available and so the present process is less susceptible to price increases due to scarcity of a required raw material and is less susceptible to shut-downs due to lack of raw materials. The non-coking coals and the poorly coking coals, such as sub-bituminous steam coal, lignite, char, anthracite and coke breeze, and the iron oxide-bearing materials employed, are relatively inexpensive.

No asphaltic or other binder is required by the present method and none is employed. Instead, water has been found to be useful to sufficiently hold together the particles of the charge to the coke oven so that coke of good strength will be produced during the coking operation. Yet, unless at least a major proportion of the fusible particles and at least a substantial proportion of the non-fusible particles are smaller than about 0.15 mm. the water will not sufficiently hold the particles of the charge together to produce a compact of desired strength and stability. While it is desirable for the fusible and non-fusible particles to be dry initially, usually being of a moisture content less than about 1%, and with no surface moisture (because such can cause uneven mixing and some agglomeration) and to be premixed before addition of water, it is contemplated as being within the invention to admix the particles and water in suitable equipment by other methods which also result in even distributions of the particles and moisture.

Another advantage of the present invention is that the stability of the coke made is already high before the usual coking end-temperature of about 1,000° C. is reached. In other words, the coke may be discharged from the coke oven when the temperature has been increased to as low as 600° C., at which discharge temperature the hydrogen content of the coke will still be desirably high. Of course, by halting the coking process at temperatures considerably lower than those normally employed, significant energy savings will result, as well as increased production capacity of the slot coke oven and less wear on it. During the preparation of the compacted forms, the use of smooth double rolls also will require less power, will involve less wear on the compacting means and will increase production capacity, compared to pocketed double rolls for forming briquettes. With respect to end-use characteristics of a coke made, blast furnace performance will be improved significantly because of the coke's high stability and low reactivity.

As was previously mentioned, the working examples given herein were actually run in the author's laboratory. The conditions of the experiments are considered to be directly applicable to slot coke oven operations and hence the experiments and this disclosure support claims to such operations. The results obtained with charges the slot coke oven are also considered to be applicable to charges which also include conventional coking blends, although the favorable results will not usually be obtained to the same extent. In such mixes it will be preferred for the fusible bituminous coal and non-fusible material utilized in the working examples to constitute a major proportion of the charge but desirable results may also be obtained when lesser proportions thereof are present. Instead of employing particular fusible bituminous coals, mixtures thereof may be utilized and similarly, mixtures of various non-fusible materials may also be employed, with single or mixed fusible materials. In summary, the present invention provides an economical method to produce a superior product with readily available and comparatively cheap starting materials, while at the same time lowering production costs and energy requirements. Therefore, it represents a significant advance in the art.

The invention has been described with respect to specific illustrations, embodiments and working examples. However, it is not to be limited to these because it is evident that one of skill in the art with the present specification before him will be able to utilize substitutes and equivalents without departing from the invention.

What is claimed is:

1. A process for making strong metallurgical coke in a slot coke oven which comprises making a charge for said coke oven which shrinks during carbonization by mixing together, in a proportion which will result in the mix becoming transiently plastic during subsequent heating in a coke oven, particles of a fusible bituminous coal or a mixture of such coals of which about a major proportion by weight is of a size or sizes smaller than about 0.15 millimeter, and particles of a non-fusible material or mixture of such materials compatible with a blast furnace burden, of which at least a substantial proportion by weight is of a size smaller than about 0.15 mm., adding water to said mixture in such a proportion that subsequent compacting of such a mixture mixed with the water, at a pressure higher than about 500 kilograms per square centimeter, squeezes out at least 0.1% of water, by weight, based on the weight of the admixed water, mixing together the mixture of fusible bituminous coal particles and non-fusible material particles and the water, compressing such resulting mixture into a compacted product at a pressure higher than 500 kg./sq. cm. and heating the resulting compacted product and any fragments thereof which may be present, in a slot coke oven as at least a part of a charge thereto, so that the charge in such oven becomes transiently plastic and shrinks during such heating, and a strong metallurgical coke results.

2. A process according to claim 1 wherein the non-fusible material is selected from the group consisting of non-coking coal, poorly coking coal, coke breeze, char, anthracite, lignite, iron oxide bearing materials, and mixtures thereof, the mixture of water, fusible bituminous coal particles and non-fusible material particles is mulled, and the water squeezed out of the body of the mix during subsequent compacting lubricates surfaces of a compacting means and facilitates release of the compacted product from said compacting means.

3. A process according to claim 1 wherein before heating of the compacted product in the slot coke oven, such product and any fragments thereof present are dried.

4. A process according to claim 1 wherein the compacted product and any fragments thereof are carbonized in the slot coke oven at an end-temperature in the range of about 600° to about 1,000° C.

5. A process according to claim 1 in which the compacting pressure is in the range of 750 to 5,000 kg./sq. cm.

6. A process according to claim 1 wherein the weight ratio of fusible bituminous coal particles to particles of non-fusible material is in the range of 0.3 to 0.8 and the compacted product and any fragments thereof in a charge to the slot coke oven are heated at such a rate that they pass through the transient plastic phase temperature range of 350° to 475° C. over a period of from about 30 minutes to about 5 hours.

7. A process according to claim 6 wherein the weight ratio of fusible particles to non-fusible particles is in the lower part of the 0.3 to 0.8 range when the transition period is in the longer part of the 30 minutes to 5 hours range, and is in the higher part of such 0.3 to 0.8 range when the transition period is in the shorter part of the 30 minutes to 5 hours range.

8. A process according to claim 1 in which the mixture of fusible bituminous coal particles, non-fusible material particles and water is mulled, and subsequently is compressed into briquettes of conventional shape and sizes, by pocketed double rolls.

9. A process according to claim 1 in which the mixture of fusible bituminous coal particles, non-fusible material particles and water is mulled, and subsequently is compressed into compacted form by smooth double rolls forming a strip, which is subsequently fragmented.

10. A process according to claim 1 wherein before heating of the compacted product and any fragments thereof, such are dried to a moisture content of no more than 3% and subsequently are carbonized in the slot coke oven at an end-temperature in the range of about 600° to about 1,000° C.

11. A process according to claim 10 wherein the weight ratio of fusible bituminous coal particles to particles of non-fusible materials is in the range of 0.3 to 0.8, the compacting pressure is in the range of 750 to 5,000 kg./sq. cm., the resulting compacted product is of improved strength, exhibiting decreased incidental fragmentation and degradation compared to other such products compacted at lower pressures, the compacted product and any fragments thereof constitute a charge to the slot coke oven, and such charge is heated at such a rate that it passes through a transient plastic phase temperature range of 350° to 475° C. over a period of from about 30 minutes to about 5 hours.

12. A process according to claim 11 in which the mixture of fusible bituminous coal particles, non-fusible material particles and water is mulled, and subsequently is compressed into compacted briquettes of conventional shape and size by pocketed double rolls.

13. A process for making a compacted material, which will shrink to a strong metallurgical coke during carbonization in a slot coke oven, which comprises mixing together in a proportion which will result in the mix becoming transiently plastic during subsequent heating in a slot coke oven, particles of a fusible bituminous coal of which a major portion by weight is of a size or sizes smaller than 0.15 mm. and particles of a non-fusible material compatible with a blast furnace burden, in which non-fusible material at least a substantial proportion by weight of the particles is of a size or sizes smaller than about 0.15 mm., adding water to said mixture in such a proportion that subsequent compacting of said mixture with the water at a pressure higher than about 500 kg./sq. cm. squeezes out at least 0.1% of the added water, mixing together the mixture of fusible bituminous coal particles and non-fusible material particles and the water, and compressing such resulting mixture into compacted form at a pressure higher than about 500 kg./sq. cm. so as to squeeze out at least 0.1% of the added water.

14. A process for making compacted material which will shrink to a strong metallurgical coke during carbonization in a slot coke oven which comprises mixing together in a proportion which will result in the mix becoming transiently plastic during subsequent heating in said coke oven, dry particles of a fusible bituminous coal of which at least about 50% by weight is smaller than 0.15 mm. and dry particles of a non-fusible material compatible with a blast furnace burden, in which non-fusible material at least about 35% by weight is smaller than 0.15 mm., adding water to said mixture in such a proportion that subsequent compacting of such mixture with the water at a pressure higher than about 750 kg./sq. cm. squeezes out at least 0.1% of the added water, mixing together the mixture of fusible bituminous coal particles and non-fusible material particles and the water, and compressing such resulting mixture into compacted form at a pressure higher than about 750 kg./sq. cm. so as to squeeze out at least about 0.1% of the added water.

* * * * *